Oct. 3, 1967
B. R. HAYWORTH ETAL
3,345,587
DISTRIBUTED CONSTANT PULSE LINE
Filed Aug. 7, 1964
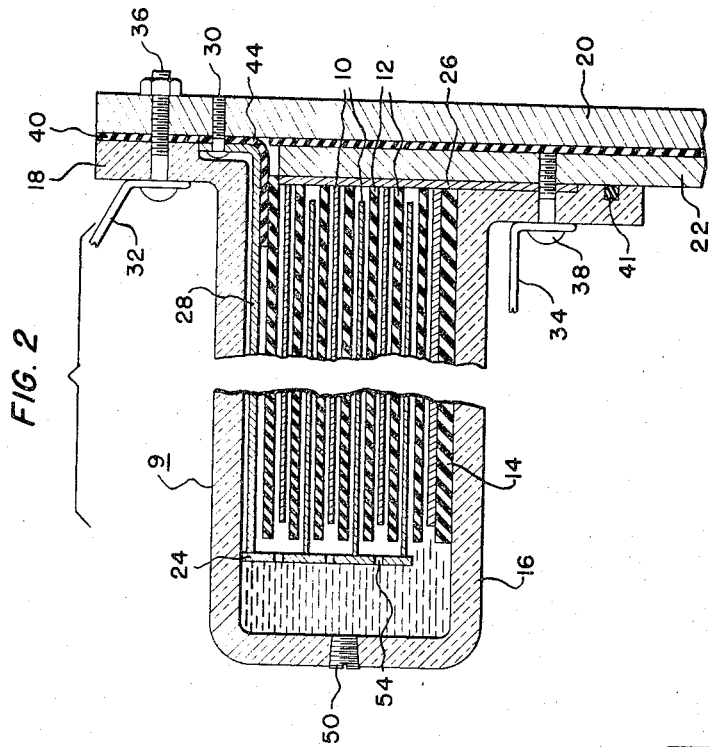
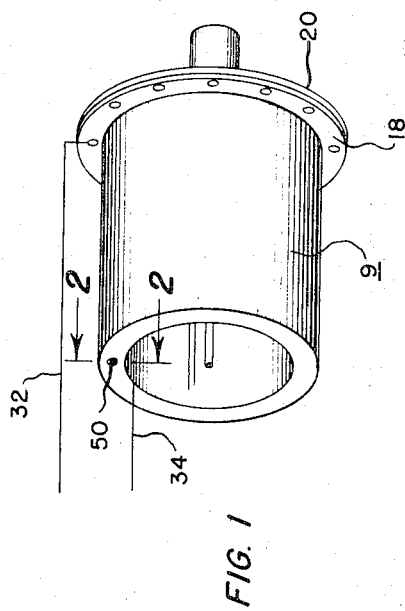
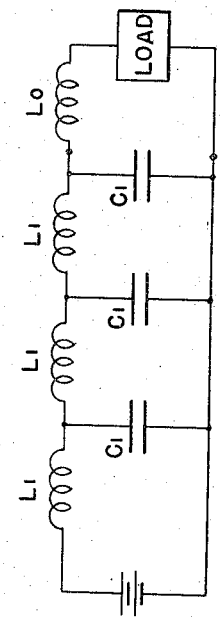
INVENTORS
BRUCE R. HAYWORTH
TERENCE J. GOODING
BY
*Carl R. Brown*
ATTORNEY

United States Patent Office 3,345,587
Patented Oct. 3, 1967

3,345,587
DISTRIBUTED CONSTANT PULSE LINE
Bruce R. Hayworth and Terence J. Gooding, San Diego, Calif., assignors to General Dynamics Corporation, San Diego, Calif., a corporation of Delaware
Filed Aug. 7, 1964, Ser. No. 388,194
6 Claims. (Cl. 333—31)

ABSTRACT OF THE DISCLOSURE

This invention relates to a capacitor type device having a plurality of layers of electrodes spirally wound in a toroid with alternate layers having extended edge margins and an increased in thickness conductor shield being wrapped around the outer electrode to reduce inductance and achieve a substantially square wave output.

---

The invention described herein was made in the performance of work under a NASA contact and is subject to the provisions of the National Aeronautics and Space Act of 1958, Public Law 85–568 (72 Stat. 426; 42 U.S.C. 2451), as amended.

The use of high power pulses of electrical energy in many applications, such as for example, in coaxial plasma gun applications, requires high power pulses having a controlled wave form shape such as a square wave form shape. The normal wave shape of the input and output of conventional high power capacitors is substantially a sine wave. It is therefore advantageous to have a pulse line with a capacitor type device and one that is capable of providing high power wave forms of controlled shape.

It is therefore an object of this invention to provide an improved distributed constant pulse line for providing high power pulses of electrical energy that may have a controlled shape.

The distributed constant pulse line of this invention has a mechanical construction somewhat similar to conventional capacitors. A spirally arranged group of windings are made of alternate layers of dielectric and electrodes, which electrodes may be layers of metal foil. The sides of the electrodes or foil layers extend alternately beyond the dielectric layers and form ends to which appropriate electrical connections to conductors are made. One of the conductors is attached to one of the sides of the extending foil layers and is in turn integrally secured to a shield conductor that forms a close fitting sheath of metal extending coaxially along either the inside or outside diameter of the windings to the other side, where the sheath is secured to a flange conductor. The conductor attached to ends of the extending foil layers on the other side of the windings is also secured to a flange conductor. The flange conductors constitute a transmission line for delivering the high powered pulses to a load. In difference from conventional cylindrical capacitors, the electrode layers are wound on a hollow core in the form of a toroid and have a close-fitting sheath of metal that returns the current coaxially along the outside diameter of the windings.

Other objects and many attendant advantages of this invention will be more readily apparent as the same becomes better understood in the following description in which like referenced numerals designate like parts throughout the figures thereof.

FIGURE 1 is a perspective view of the invention mounted to a coaxial plasma gun, which gun is only partially shown.

FIGURE 2 is a cross-section of a view of the invention shown in FIGURE 1 taken along lines 2—2.

FIGURE 3 is an equivalent circuit generally representing the electrical parameters of the pulse line.

Referring now to FIGURES 1 and 2 in the drawings, a distributed constant pulse line 9 has the shape of a toroid. A plurality of alternate electrode layers 10 and sheets of dielectric 12 are spirally wound on a hollow core base insulator 14. Alternate ones of said electrode layers extend beyond the insulation on the back side (the left side of FIGURE 2) and are electrically connected to the back conductor plate 24. The electrode layers in-between the alternate electrode layers that extend beyond the insulation layers on the front side are electrically connected to the front conductor plate 26. The front conductor plate 26 is electrically connected to the first output transmission flange member 22 while the back conductor plate 24 is connected via a close fitting conductor shield 28 directly to the second output transmission flange 20 at point 30. A relatively thick layer of insulation 44 separates that portion of the conductor shield 28 that is immediately adjacent to the front conductor plate 26.

The conductor shield 28, as well as the front and back conductor plates 24 and 26, may be made of sheet copper or of other similar constructions and have a thickness considerably larger than that of the metal foils or electrode layers 10. Generally this large thickness would be in the order of 20 times the thickness of the electrode layers.

The entire windings array is enclosed by a case 16 that is made of insulating material such as fiberglass or the like. The case 16 is secured to output transmission flanges 20 and 22 by connectors 36 and 38. The case is sealed to hold liquid by insulator-gasket 40 and O-ring 41. A fitting 50 is provided for opening case 9 and inserting insulating oil by pumping or the like. The oil is forced through opening 50 and apertures 54 to purge air voids that may exist. The air bleeds out of the case through aperture 50. This oil insulation reduces the possibility of ionization breakdown between the foil layers.

Electrical power is supplied to lines 32 and 34 from a suitable source (not shown) and through connection bolts 36 and 38 to the second 20 and first 22 conductor flanges respectively. The electrical power flows from the conductor flanges through the conductor plates 24 and 26 to the opposing electrode layers. This creates the capacitive electrical circuit that forms the pulse line.

The circuit in FIGURE 3 illustrates a simple equivalent circuit of the pulse line and the load. In the equivalent circuit the capacitance $C_1$ and inductance $L_1$ represents these values in the toroid windings. Each capacitance $C_1$ and inductance $L_1$ represents one foil winds with its corresponding dielectric layer. The inductance $L_0$ represents the inductance external to the electrode windings 10 and dielectric layers 12 and includes the inductance in the external shield 28. The invention will be related to this substantially equivalent circuit later in this description.

In operation electrical power is supplied through input lines 32 and 34 to the electrodes 10. When the transmission flanges 20 and 22 are open, electrical power builds up in the alternate electrodes. When a load is placed across the transmission flanges 20 and 22 current begins to flow and an electromotive wave propagates through the electrode windings starting adjacent to the outer shield 28 at the outside diameter of the toroid arranged windings and progresses away or radially inwardly around the spiral from the return conductor 28. It should be understood that the conductor shield or return conductor 28 may be positioned either on the outside of the windings as shown in FIGURE 2 or on the inside diameter of the toroid. Placing the return conductor on the inside diameter of the toroid windings will cause the electromotive wave to propagate outwardly requiring a reversal of the electrical connections shown in FIGURE 2.

The particularly distinguishing features of this invention are the close positioning of the thick outer shield conductor 28 against the electrode windings and the hollow core construction. It is believed that these features function to reduce the overall inductance $L_0$ of the circuit in FIGURE 3 that normally occurs in prior capacitor circuits. In prior art capacitors the return line follows a more circuitous path and does not function as a shield or a very low resistance conductor. Without the reduction of inductance $L_0$ the windings 10 would not exhibit pulse behavior at the transmission flanges 20 and 22.

It has been found that by varying the thickness of the dielectric layers, the spacing and/or length of the electrode layers, the values of the individual $L_1$ and $C_1$ in the equivalent circuit of FIGURE 3 will be selectively varied. This permits the impedance of the pulse line during the pulse to be changed through change in construction of the pulse line. The pulse time is controlled by the total number of $L_1 C_1$ combinations (the number of windings). By varying the combination of pulse time and impedance within the single windings, it is possible to obtain a desired output pulse wave shape. If the inductance $L_0$ normally found in prior art capacitors is not reduced, then only a sinusodial wave form output will be obtained.

What we claim is:

1. A pulse line comprising:
a plurality of layers of electrodes with layers of insulation therebetween spirally arranged in the form of a toroid,
said toroid having a front and a back side,
an alternate one of said electrode layers having a portion extending beyond said insulation toward said back side,
said spiral wound electrode layer in-between said alternate one having a portion extending beyond said insulation toward said front side,
said extending portion of said in-between electrode being electrically connected to a first output conductor on said front side and said extending portion of said alternate electrode being electrically connected to a second output conductor on said back side,
said second output conductor being electrically connected to a conductor shield that extends from said back to said front sides closely adjacent the outer surface of said electrodes,
and said conductor shield being spaced from the outside electrode layer by only one of said layers of insulation.

2. A pulse line comprising:
a plurality of layers of electrodes with layers of insulation therebetween spirally wound in the form of a toroid,
said toroid having front and back sides,
ones of said electrode layers having portions extending throughout their spiral lengths and beyond said layers of insulation toward said back side,
individual electrode layers of others of said electrode layers being positioned in-between said ones of said electrode layers and having portions extending beyond said layers of insulation toward said front side,
said extending portions of said in-between electrodes being electrically connected to a first output conductor plate on said front side and said extending portions of said ones of said electrode layers being electrically connected to a second output conductor plate on said back side,
each of said layers of insulation having substantially the same thickness,
said second output conductor plate being electrically connected to a conductor shield that extends from said back to said front sides enclosing the radially outward surface of said toroid,
and said conductor shield being spaced from the outermost electrode layer by only one of said layers of insulation.

3. A pulse line comprising:
a plurality of layers of electrodes with layers of insulation therebetween being spirally wound in the form of a toroid,
said toroid having a front side and a back side,
one electrode layer of said electrode layers having a side extending beyond said insulation layers toward said back side,
another adjacent electrode layer of said electrode layers having a side extending beyond said insulation layers toward said front side,
said extended side of said another electrode layer being electrically connected to a first output conductor plate on said front side and said extended side of said one electrode layer being electrically connected to a second output conductor plate on said back side,
each of said layers of insulation having substantially the same thickness,
said second output conductor plate being electrically connected to a conductor shield that extends from said back to said front sides enclosing the radially outward surface of said toroid,
said conductor shield being spaced from the outermost electrode layer by only one of said layers of insulation,
and said conductor shield having a thickness substantially greater than the thickness of said electrode layer.

4. A pulse line comprising:
a plurality of layers of electrodes with layers of insulaation there between being spirally wound in the form of a toroid,
said toroid having a front and a back side,
one electrode layer of said electrode layers having an edge portion extending beyond said insulation layers toward said back side,
another adjacent electrode layer of said electrode layers having an edge portion extending beyond said insulation layers toward said front side,
said extended portion of said another electrode layer being electrically connected to a first output conductor plate on said front side and said extended portion of said one electrode layer being electrically connected to a second output conductor plate on said back side,
said second output conductor plate being electrically connected to a conductor shield that extends from said back side to said front side completely enclosing the radially outer surface of said toroid,
said conductor shield being spaced from the outer most electrode layer by only one of said layers of insulation,
and said conductor shield having a thickness substantially greater than the thickness of said electrode layer.

5. A pulse line comprising:
a plurality of layers of electrodes with layers of insulation there between being spirally wound in the form of a toroid,
said toroid having a front side and a back side,
one electrode layer of said electrode layers having an edge portion extending beyond said insulation layers toward said back side,
another adjacent electrode layer of said electrode layers having an edge portion extending beyond said insulation layers toward said front side,
said extended portion of said another electrode layer being electrically connected to a first output conductor plate on said front side and said extended portion of said one electrode layer being electrically connected to a second output conductor plate on said back side, each of said layers of insulation having substantially the same thickness, said second output conductor plate being electrically connected to a conductor shield that extends from said back side to said front side completely enclosing the radially outward surface of said toroid, said conductor shield being spaced from the outermost electrode layer by only one of said layers of insulation, said first and second conductor plates and said conductor shield having thicknesses substantially greater than the thicknesses of said electrode layers, at least one of said conductor plates having apertures therethrough for admitting insulating oil under pressure between said electrode layers and said layers of insulation for purging air therefrom, and sealed case means for enclosing said toroid.

6. A pulse line comprising:

a plurality of layers of electrodes with layers of insulation there between being spirally wound in the form of a toroid, said toroid having a front side and a back side, one electrode layer of said electrode layers having an edge portion extending beyond said insulation layers toward said back side, another adjacent electrode layer of said electrode layers having an edge portion extending beyond said insulation layers toward said front side, said extended portion of said another electrode layer being electrically connected to a first output conductor plate on said front side and said extended portion of said one electrode layer being electrically connected to a second output conductor plate on said back side, each of said layers of insulation having substantially the same thickness, said second output conductor plate being electrically connected to a conductor shield that extends from said back side to said front side enclosing the radially outward surface of said toroid, said conductor shield being spaced from the outer most electrode layer by only one of said layers of insulation, said first and second conductor plates and said conductor shield having thicknesses substantially greater than the thicknesses of said electrode layers, and the inter-diameter of said toroid being mounted on a hollow insulating member which member has a thickness substantially larger than each of said layers of insulation.

References Cited

UNITED STATES PATENTS

| | | | |
|---|---|---|---|
| 2,039,340 | 5/1936 | Olving | 317—260 |
| 2,740,926 | 4/1956 | Jennings et al. | 317—242 X |
| 3,014,167 | 12/1961 | Winter et al. | 317—242 X |

HERMAN KARL SAALBACH, *Primary Examiner.*

ELI LIEBERMAN, *Examiner.*

M. NUSSBAUM, *Assistant Examiner.*